(12) United States Patent
Lee et al.

(10) Patent No.: US 8,103,267 B2
(45) Date of Patent: Jan. 24, 2012

(54) FEMTOCELL BASE STATION WITH MOBILE STATION CAPABILITY

(75) Inventors: Anthony Lee, San Diego, CA (US); Ning Nicholas Chen, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 1067 days.

(21) Appl. No.: 11/861,772

(22) Filed: Sep. 26, 2007

(65) Prior Publication Data
US 2009/0082010 A1  Mar. 26, 2009

(51) Int. Cl.
H04W 24/00 (2009.01)
(52) U.S. Cl. ........ 455/423; 455/424; 455/425; 455/502; 455/67.11; 455/456.1; 455/420; 455/88; 455/115.1; 455/115.2
(58) Field of Classification Search .................. 455/423, 455/424, 425, 502, 67.11, 456.1, 420, 88, 455/115.1, 115.2, 226.1
See application file for complete search history.

(56) References Cited

U.S. PATENT DOCUMENTS

| | | | |
|---|---|---|---|
| 5,508,708 A | 4/1996 | Ghosh et al. | |
| 5,920,554 A | 7/1999 | Nakamura et al. | |
| 6,049,596 A | 4/2000 | Dumaine et al. | |
| 6,141,565 A | 10/2000 | Feuerstein et al. | |
| 6,246,673 B1 | 6/2001 | Tiedemann et al. | |
| 6,526,039 B1 | 2/2003 | Dahlman et al. | |
| 6,711,149 B1 | 3/2004 | Yano et al. | |
| 6,775,318 B2 | 8/2004 | Chen et al. | |
| 6,829,534 B2 | 12/2004 | Fuchs et al. | |
| RE38,808 E | 10/2005 | Schuchman et al. | |
| 6,975,988 B1 | 12/2005 | Roth et al. | |
| 7,064,709 B1 | 6/2006 | Weisenburger et al. | |
| 7,289,473 B1 | 10/2007 | Padovani et al. | |
| 7,388,838 B2 | 6/2008 | Abraham et al. | |
| 7,423,994 B2 | 9/2008 | Liu et al. | |
| 7,500,119 B2 | 3/2009 | Tsai | |
| 7,509,124 B2 | 3/2009 | O'Neil | |
| 7,551,930 B2 | 6/2009 | Lempio et al. | |
| 7,603,116 B2 * | 10/2009 | Muraoka | 455/424 |

(Continued)

FOREIGN PATENT DOCUMENTS

CN    1229563    9/1999

(Continued)

OTHER PUBLICATIONS

Claussen, Holger et al. "Performance of Macro- and Co-Channel Femtocells in a Hierarchical Cell Structure." The 185h Annual IEEE International Symposium on Personal., Indoor and Mobile Radio Communications (PIMRC'07), 2007 IEEE pp. 1-5.

*Primary Examiner* — Patrick Edouard
*Assistant Examiner* — Julio Perez
(74) *Attorney, Agent, or Firm* — James W. Huffman

(57) ABSTRACT

A communication device that includes a femtocell base station and a mobile station transmitter/receiver. The femtocell base station may provide bidirectional internet protocol (IP) communication for one or mobile devices to a cellular network. The femtocell base station may be operable to communicate with the cellular network using a wide area network. The mobile station transmitter/receiver may be coupled to the femtocell base station (in a same housing). The mobile station transmitter/receiver may be operable to perform radio frequency (RF) wireless communication with the cellular network, e.g., to detect and/or report environmental parameters, performing testing (e.g., loopback testing), and/or provide communication for the one or more mobile devices (e.g., when the wide area network is down), among others.

18 Claims, 6 Drawing Sheets

U.S. PATENT DOCUMENTS

| | | |
|---|---|---|
| 7,613,444 B2 * | 11/2009 | Lindqvist et al. ............. 455/403 |
| 7,664,492 B1 | 2/2010 | Lee et al. |
| 7,756,531 B2 | 7/2010 | Aminzadeh |
| 7,768,983 B2 | 8/2010 | Nylander et al. |
| 7,817,997 B2 | 10/2010 | Nylander et al. |
| 2002/0049058 A1 | 4/2002 | Tee |
| 2002/0187792 A1 | 12/2002 | Kato et al. |
| 2003/0202564 A1 | 10/2003 | Ho et al. |
| 2004/0057468 A1 | 3/2004 | Shieh et al. |
| 2004/0165528 A1 | 8/2004 | Li et al. |
| 2004/0170221 A1 | 9/2004 | Storm et al. |
| 2004/0205158 A1 | 10/2004 | Hsu |
| 2005/0192024 A1 | 9/2005 | Sheynblat |
| 2006/0274743 A1 | 12/2006 | Yegin et al. |
| 2006/0276201 A1 | 12/2006 | Dupray |
| 2007/0183427 A1 | 8/2007 | Nylander et al. |
| 2007/0258395 A1 * | 11/2007 | Jollota et al. .................. 370/310 |
| 2008/0076392 A1 | 3/2008 | Khetawat et al. |
| 2008/0076398 A1 | 3/2008 | Mate et al. |
| 2008/0130596 A1 | 6/2008 | Kalhan |
| 2008/0188265 A1 | 8/2008 | Carter et al. |
| 2008/0244148 A1 | 10/2008 | Nix et al. |
| 2008/0287153 A1 * | 11/2008 | Fullam ......................... 455/502 |
| 2009/0029645 A1 | 1/2009 | Leroudier |
| 2009/0034482 A1 | 2/2009 | Hahm et al. |
| 2009/0061892 A1 | 3/2009 | Lee et al. |
| 2009/0092078 A1 | 4/2009 | Czaja et al. |
| 2009/0092096 A1 | 4/2009 | Czaja et al. |
| 2009/0092122 A1 | 4/2009 | Czaja et al. |
| 2009/0093246 A1 | 4/2009 | Czaja et al. |
| 2009/0093252 A1 | 4/2009 | Czaja et al. |
| 2009/0135758 A1 | 5/2009 | Alper et al. |
| 2009/0298475 A1 | 12/2009 | Czaja et al. |
| 2009/0298515 A1 | 12/2009 | Czaja et al. |

FOREIGN PATENT DOCUMENTS

| | | |
|---|---|---|
| CN | 1783822 | 6/2006 |
| CN | 1894979 A | 1/2007 |
| WO | WO 2007016499 | 2/2007 |

* cited by examiner

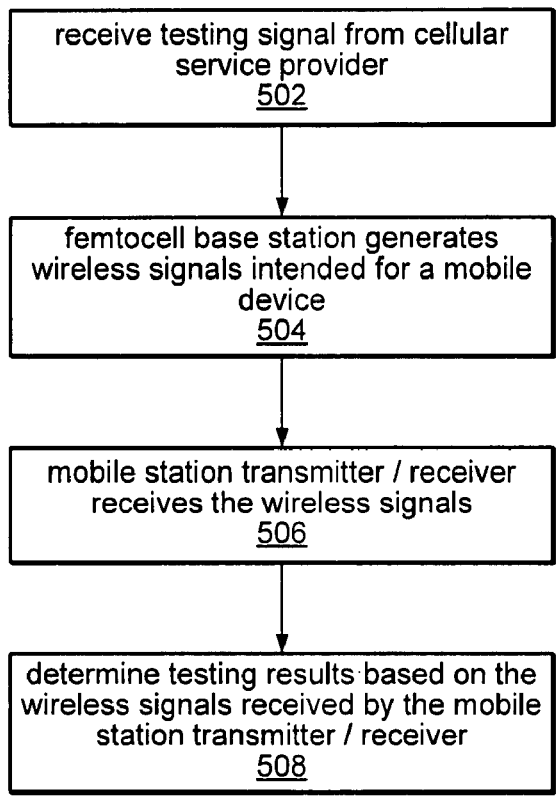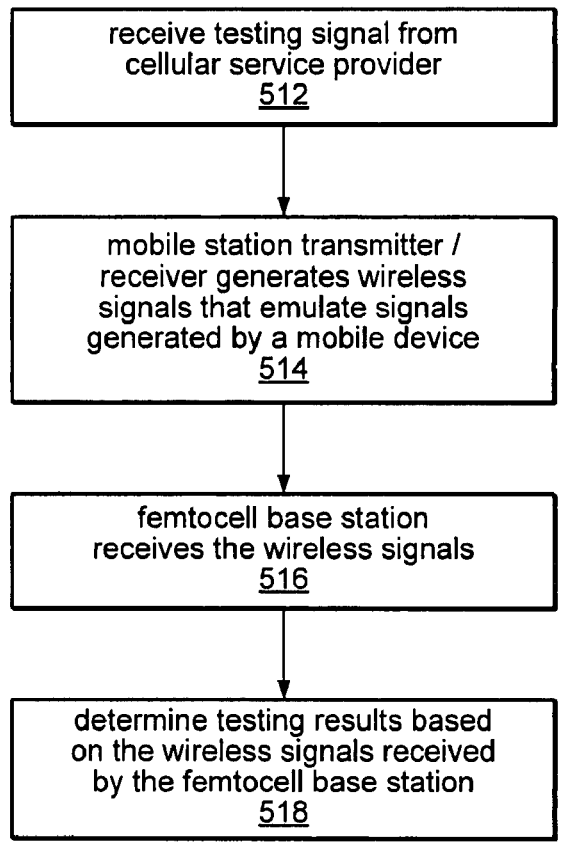
FIG. 5A
FIG. 5B

FEMTOCELL BASE STATION WITH MOBILE STATION CAPABILITY

FIELD OF THE INVENTION

The present invention relates to the field of cellular networks, and more particularly to a communications device which provides femtocell base station and mobile station communication with a cellular network.

DESCRIPTION OF THE RELATED ART

In recent years, the use of mobile devices and, in particular, cellular telephones has proliferated. As a result, focus on reception for cellular telephones, especially in homes or primary residences, has increased. Additionally, typical users of mobile telephones use or subscribe to data services for their homes. As a result, femtocells have begun to be used in the home to provide cellular service to cell phones using the data service of the user. Thus, these femtocells provide excellent service where cell phones are used most and typically make use of data plan services (e.g., DSL, fiberoptic, cable, WiMAX, etc.), which may not require a nearby macro cell of the cell phone service provider. However, femtocells typically are not able to communicate with cell phone towers or base stations. Thus, improvements in femtocells would be desirable.

SUMMARY OF THE INVENTION

Various embodiments are presented of a communications device which includes a femtocell base station and a mobile station transmitter/receiver.

More specifically, a home may include one or more mobile devices (e.g., cell phones used by various users), a communications device, and a broadband device. The communications device may include both a femtocell base station and a mobile station transmitter/receiver. The communications device may be coupled to the broadband device to enable the communications device to communicate over a broadband IP network.

The femtocell base station may operate to receive wireless communication (e.g., radio frequency (RF) communication) from the one or more mobile devices and provide corresponding signals or communication with mobile operator(s) (or cellular service providers) corresponding to the providers of the mobile devices. More specifically, the femtocell base station may operate to provide communication for the mobile devices over an IP wide area network (e.g., the Internet, via the user's internet service provider (ISP)) using the broadband communications device. The broadband device thus may communicate with the cellular service provider via the Internet. The cellular service provider may also be coupled to macro base stations (sometimes referred to as cell phone towers or macro cell stations) which may operate to provide service to the mobile devices when outside of range of the communications device and/or when the communications device is disabled or non-operational. Thus, the femtocell base station of the communications device may provide bi-directional communication for the mobile devices via an IP network such as the Internet. Stated another way, users in the home may use their cell phones which communicate with the communications device (the femtocell base station in the communication device acting as a "mini cell tower"), wherein the user's voice/data communications are then transmitted/ received to/from the cellular service provider over an IP network.

The mobile station transmitter/receiver (or mobile station transceiver) may operate to communicate with the mobile devices and the cell towers using wireless cellular communication such as RF. However, it should be noted that in some embodiments, the mobile station transceiver may not communicate directly with the mobile devices (e.g., it may receive signals from the mobile devices via another components, such as the femtocell base station). The mobile station transmitter/receiver may be used for loopback testing, reporting of environmental factors, and to provide redundancy when the IP network is down, thus improving cellular reception in the home. Thus, in some embodiments, the mobile station transmitter/receiver may be used to monitor environmental factors of the communications device (e.g., neighboring macro cell stations, neighboring femtocells, radio frequency traffic in the home, etc.) and may convey that information (e.g., to the service provider via the macro cell station or the IP network, as desired) for configuration of the communications device. This information may be critical during initial set up of the communications device. Correspondingly, macro cell station may communicate with the communications device (using the mobile station transceiver) during installation of the communications device to perform set-up operations. The mobile station transmitter/receiver may also allow for initiation of testing (e.g., loopback testing) of the communications device, e.g., in response to signals from the cell towers. Further, the mobile station transmitter/receiver may operate to provide RF communication between the femtocell base station and the cellular tower when the IP network is down.

The mobile devices may include any type of device which may be used in a cellular network, e.g., RF communication. For example, mobile devices may include cellular (or cell) phones (including smart phones), personal digital assistants (PDAs) with mobile communication capabilities, laptops or computer systems with mobile communication components, and/or any device which is operable to communicate with a cellular network.

The broadband device may include a router and/or cable modem for connecting to the ISP. In one embodiment, the broadband device may include a wireless router (or one or more wireless hubs) which may provide wireless communication (e.g., using 802.11x communication technology) for the communications device. Additionally, the broadband device may be connected to the wide area network via wired (e.g., cable, DSL, fiberoptic, power lines, etc.) or wireless means (e.g., WiMAX or other wireless communication methods), as desired. Alternatively, or additionally, the broadband device may be coupled to the communications device remotely, e.g., via a WiMAX wireless connection. Furthermore, in one embodiment, the communications device may include the broadband device 130 (e.g., in an all-in-one solution for the user).

Thus, the communications device (and more specifically, the femtocell base station) may provide access to the cellular network via the wide area network (e.g., the Internet) using the broadband device (wired or wirelessly), as opposed to the mobile station transmitter/receiver which may provide access to the cellular network using cell towers.

BRIEF DESCRIPTION OF THE DRAWINGS

A better understanding of the present invention can be obtained when the following detailed description of the preferred embodiment is considered in conjunction with the following drawings, in which:

FIGS. 5A and 5B are flowcharts of an exemplary method for performing testing of the communications device.

Figure 1:
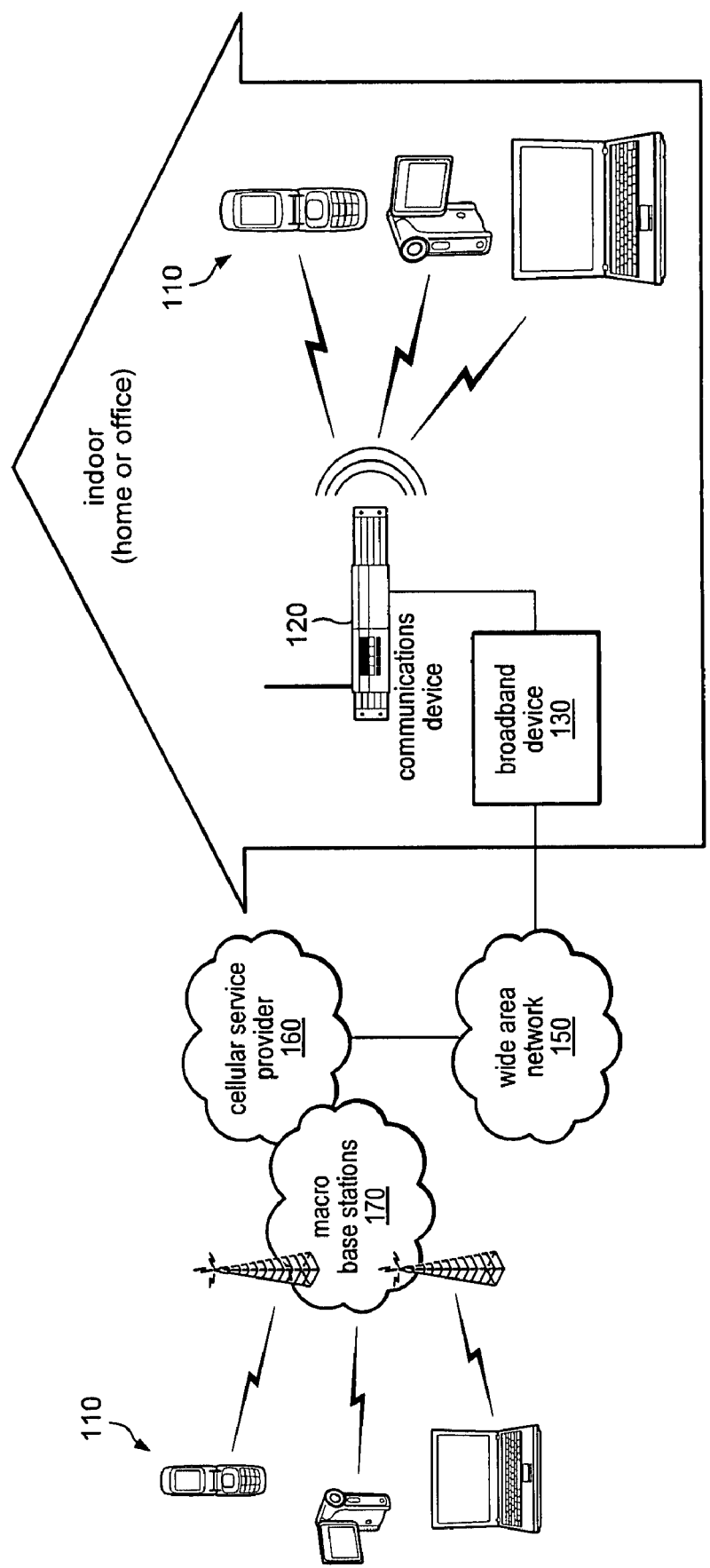
FIG. 1 is an exemplary system including a communications device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 2:
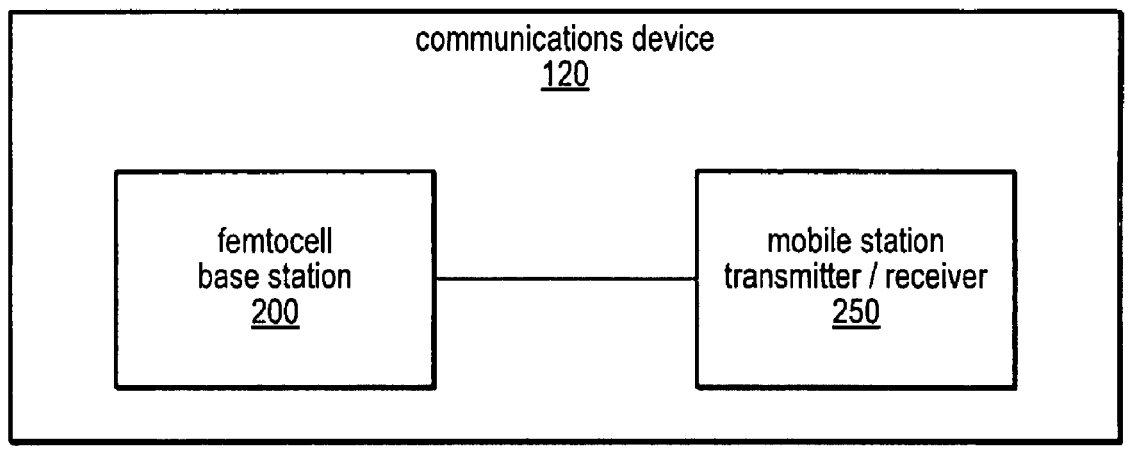
FIG. 2 is an exemplary general block diagram of the communications device according to one embodiment.

FIGS. 1 and 2—Exemplary Block Diagrams of a Communications System

FIG. 1 illustrates an exemplary system including a communications device. The term 'communications device' is intended to include typical definitions (as known by those of skill in the art) of femtocells, picocells, microcells, home base stations, access point base stations, and personal 2G-3G (or nG) base stations, among others. Additionally, the communications device includes capabilities of a mobile station transmitter/receiver (transceiver), as described in more detail below.

More specifically, FIG. 1 illustrates a home which may include one or more mobile devices 110, a communications device 120, and a broadband device 130. As shown in FIG. 2, the communications device 120 may include a femtocell base station 200 (also referred to as cellular base station or access point base station, among others) which may be coupled to a mobile station transmitter/receiver 250. The femtocell base station 200 and/or the mobile station transmitter/receiver 250 may include a processor and memory to implement their functionality. In one embodiment, each of the femtocell base station and the mobile station transmitter/receiver may have independent processors and memory; however, these components may share a processor and memory to implement the functionality described herein.

As shown in FIGS. 1 and 2, the femtocell base station 200 and the mobile/transmitter receiver 250 may be included in a same housing of the communications device 120. The housing may be plastic or metal (e.g., aluminum or other metals) and may take a box-like design. In one embodiment, the housing may include one or more lights or light emitting diodes (LEDs) which indicate the activity or operation of various components of the communications device 130 (e.g., operation of the femtocell base station 200 and/or the mobile station transmitter/receiver 250, among others).

The housing may include a power supply for providing power to the femtocell base station 200 and the mobile station transmitter/receiver 250 as well as other components of the communications device 120. The housing may also include one or more ports for coupling to other devices/communications devices. For example, in one embodiment, the housing may include a universal serial bus (USB) port (or other type of port, such as firewire, among others) for attaching devices (e.g., printers, personal music players, personal digital assistants, cell phones, external hard drives, testing devices, media controllers, etc.). Additionally, or alternatively, the one or more ports may include Ethernet ports (e.g., for coupling to a router or the communications device 130, among others), fiber ports, cable ports, etc.

The femtocell base station 200 may operate to receive wireless communication (e.g., radio frequency (RF) communication) from the one or more mobile devices 110 and provide corresponding signals or communication with mobile operator(s) (or cellular service providers) corresponding to the providers of the mobile devices 110. More specifically, the femtocell base station may operate to provide communication for the mobile devices 110 using the broadband communications device 130 over an IP wide area network 150 (e.g., the Internet, via the user's internet service provider (ISP)). The broadband device 130 may thus communicate with the cellular service provider 160 via the Internet. Moreover, the IP wide area network 150 may be private or dedicated to the user using various technologies, for example, lease line, frame relay, digital subscriber line (DSL), or dial-up service. The IP communication may be encrypted or IP tunneling may be used if supported by the IP wide area network 150. The cellular service provider 160 may also be coupled to macro base stations 170 (sometimes referred to as cell phone towers or macro cell stations) which may operate to provide service to the mobile devices 110 when outside of range of the communications device 120 and/or when the communications device 120 is disabled or non-operational. Thus, the femtocell base station of the communications device may provide bi-directional communication for the mobile devices via an IP network such as the Internet. Stated another way, users in the home may use their cell phones which communicate with the communications device (the femtocell base station in the communication device acting as a "mini cell tower"), wherein the user's voice communications are then transmitted/received to/from the cellular service provider over an IP network.

The mobile station transmitter/receiver 250 (or mobile station transceiver) may operate to communicate with the mobile devices 110 and the cell towers 170 using wireless cellular communication such as RF. However, it should be noted that in some embodiments, the mobile station transceiver 250 may not communicate directly with the mobile devices 110; instead, it may receive signals from the mobile devices 110 via another components, such as the femtocell base station 200. The mobile station transmitter/receiver 250 may be used for loopback testing, reporting of environmental factors, and to provide redundancy when the IP network is down, thus improving cellular reception in the home. Thus, in some embodiments, the mobile station transmitter/receiver 250 may be used to monitor environmental factors of the communications device 120 (e.g., neighboring macro cell stations, neighboring femtocells, radio frequency traffic in the home, etc.) and may convey that information (e.g., to the service provider via the macro cell station or the IP network, as desired) for configuration of the communications device 120. This information may be critical during initial set up of the communications device 120. Correspondingly, macro base station 170 may communicate with the communications device 120 (using the mobile station transceiver 250) during installation of the communications device 120 to perform set-up operations. The mobile station transmitter/receiver 250 may also allow for initiation of testing (e.g., loop-back testing) of the communications device 120, e.g., in response to signals from the macro base station 170.

Loopback testing may refer to any testing where the femtocell base station 200 and the mobile station transmitter/receiver 250 mutually initiate and receive signals for testing purposes. For example, the femtocell base station 200 may provide or receive wireless signals (or wired signals) for reception or produced by the mobile station transmitter/receiver 250. These loopback tests may allow for reception or transmission strength testing, determining whether components of the communications device 120 is inoperable, and/or other testing. Loopback testing may be initiated by a local device (e.g., plugged into or coupled to the communications device, possible wirelessly) and/or by a macro base station, among others.

The mobile devices 110 may include any type of device which may be used in a cellular network, e.g., RF communication. For example, mobile devices 110 may include cellular (or cell) phones (including smart phones), personal digital assistants (PDAs) with mobile communication capabilities, laptops or computer systems with mobile communication components, and/or any device which is operable to communicate with a cellular network.

The broadband device 130 may include a router and/or cable modem for connecting to the ISP 150. In one embodiment, the broadband device 130 may include a wireless router (or one or more wireless hubs) which may provide wireless communication (e.g., using 802.11x communication technology) for the communications device 120. Additionally, the broadband device 130 may be connected to the wide area network 150 via wired (e.g., cable, DSL, fiberoptic, power lines, etc.) or wireless means (e.g., WiMAX or other wireless communication methods), as desired. Alternatively, or additionally, the broadband device 130 may be coupled to the communications device 120 remotely, e.g., via a WiMAX wireless connection. Furthermore, in one embodiment, the communications device may include the broadband device 130 (e.g., in an all-in-one solution for the user).

Thus, the communications device 120 (and more specifically, the femtocell base station 200) may provide access to the cellular network via the wide area network 150 (e.g., the Internet) using the broadband device 130 (wired or wirelessly), as opposed to the mobile station transmitter/receiver 250 which may provide access to the cellular network using cell towers.

Figure 3:
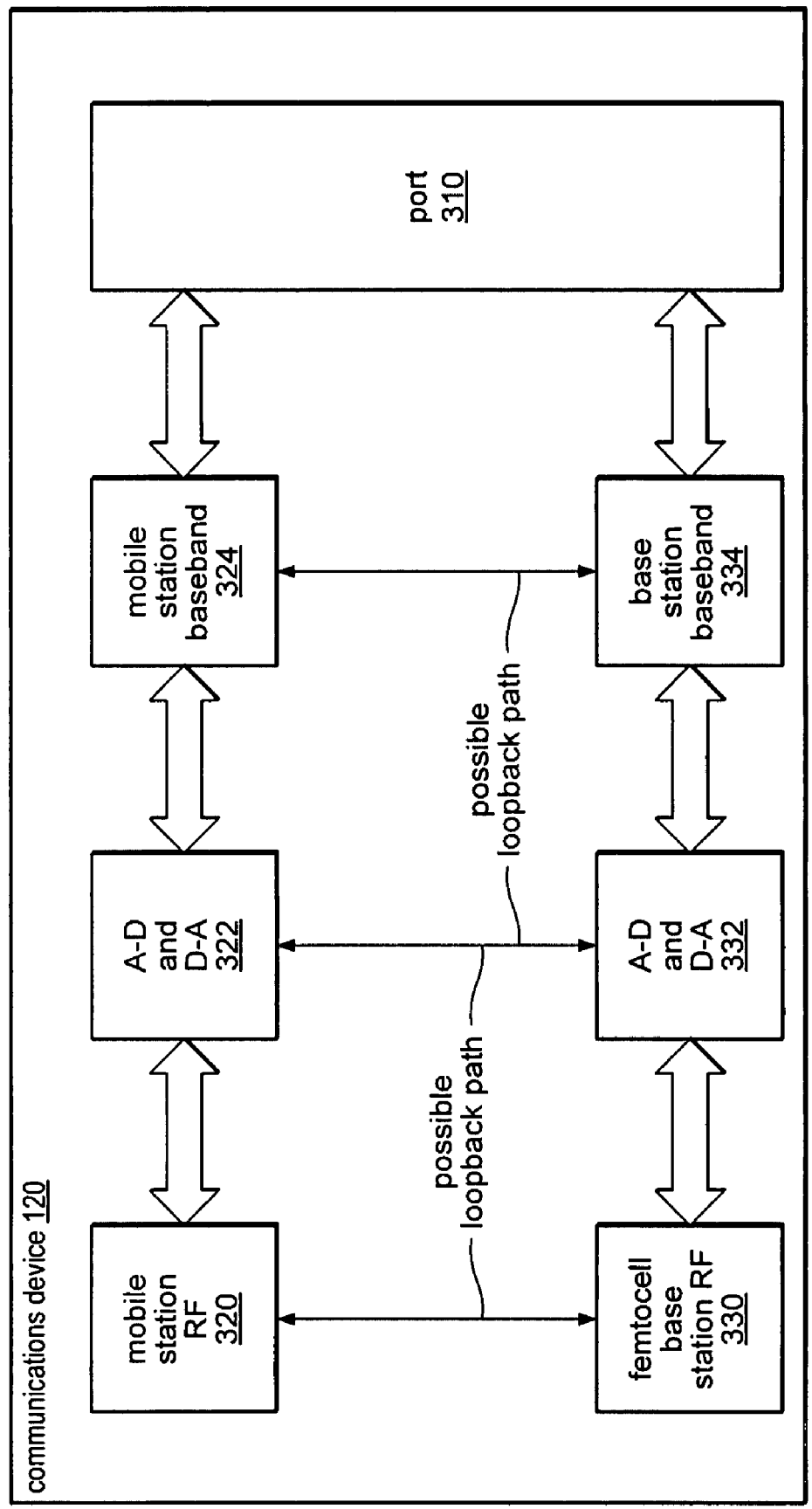
FIG. 3 is an exemplary block diagram of the communications device according to one embodiment.

FIG. 3—Exemplary Block Diagram of the Communications Device

FIG. 3 illustrates an exemplary block diagram of the communications device 120. As shown, the communications device 120 may include a port 310 (or method of access) to reach the wide area network 150 provided by the broadband communications device 130. As indicated above, the port 310 may provide for wired or wireless communication with the broadband communications device 130. In some embodiments, the port 310 may be implemented as an interface or an interconnection network coupled to the broadband communications device 130, femtocell base station 200, and/or mobile station transceiver 250. A mobile station baseband 324 and base station baseband 334 may be coupled to the port 310. Each baseband component may be in turn connected to analog to digital and digital to analog converters (322 and 332 respectively) which may be connected to respective transceivers (mobile station R/F 320 and base station R/F 330). Various ones of these components may be coupled for loopback testing (e.g., the mobile station R/F 320 to base station R/F 330, the two digital/analog converters 322 and 322, and/or the two baseband components 324 and 334, among other possible connections). Note that this block diagram is exemplary only and that various ones of the blocks may be replaced, modified, or connected in different manners, as desired.

Figure 4:
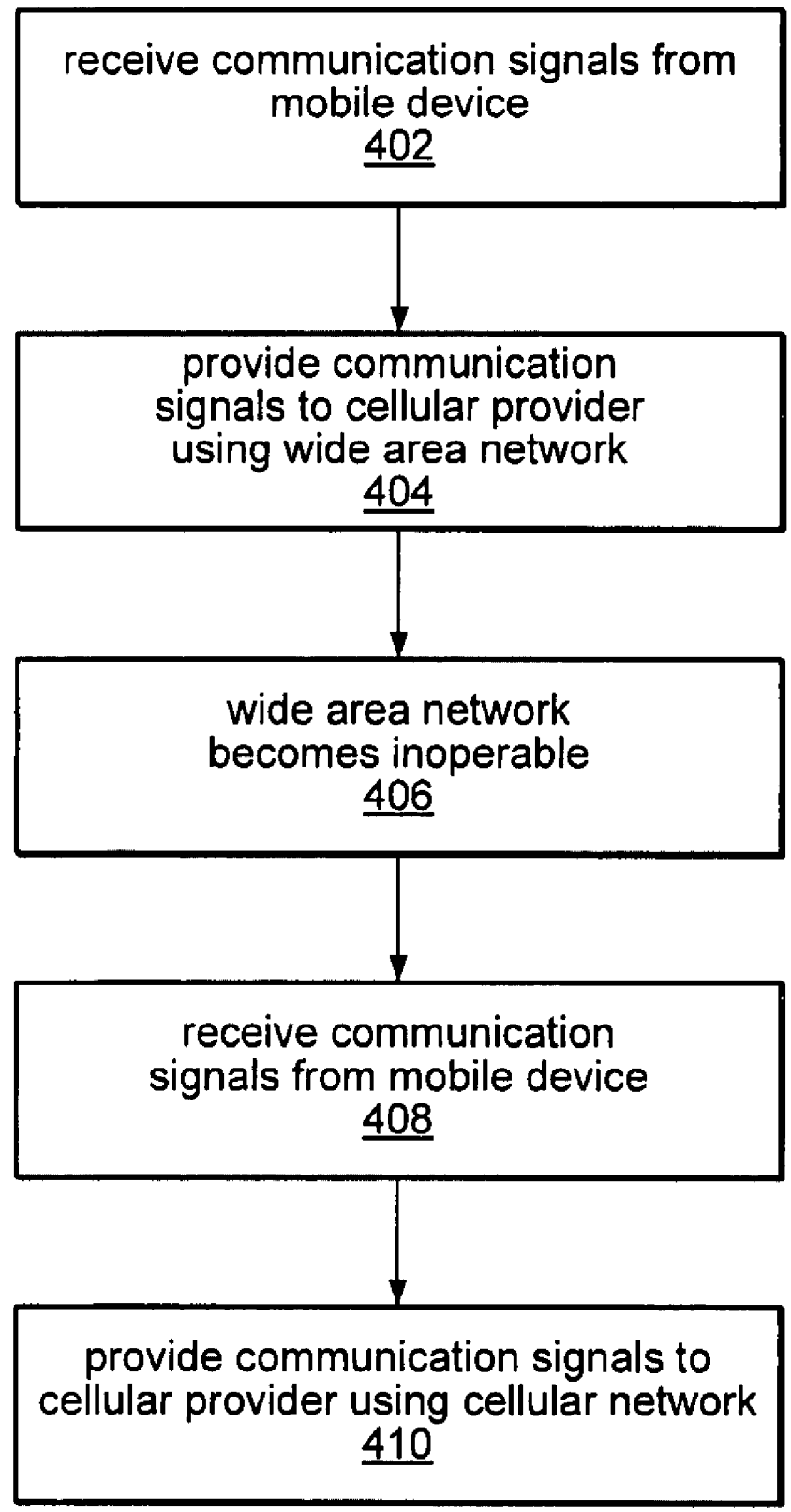
FIG. 4 is a flowchart of an exemplary method for operating the communications device when the wide area network is inoperable.

FIG. 4—Operation of the Communications Device when Network is Inoperable

FIG. 4 illustrates an exemplary method for operating the communications device when the wide area network is inoperable or disabled. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, communication signals may be received from a mobile device. More specifically, a user may operate a mobile device within range of the communications device, and the communications device may receive signals generated by the mobile device, e.g., to initiate a call. The communications device, e.g., using the femtocell base station, may receive RF signals of the mobile device and, in 404, may provide the signals (possibly after conversion) to the cellular service provider over a wide area network, such as the Internet. Thus, the communications device may use the femtocell base station to receive and convert signals from a mobile device to communicate with the cellular service provider using an IP network.

Accordingly, while the femtocell base station and wide area network are operational, the femtocell base station may provide bidirectional communication for one or more mobile devices to a cellular network, e.g., using an IP network.

In 406, the wide area network may become unavailable or inoperable. For example, the ISP of the user (connected to the broadband device) may go down, the broadband device may cease to function, a portion of the femtocell base station may cease to function, and/or any number of other problems which cause communication to/over the wide area network to become unavailable may occur. As a result, the femtocell base station may cease to be useful, at least over the wide area network, for the user of the mobile device.

Accordingly, after the wide area network becomes unavailable, in 408, communication signals may be received from the mobile device. The communications device may be operating in a different mode based on 406. The communications device (e.g., the mobile station transmitter/receiver and/or the femtocell base station) may receive the wireless signals and may provide the signals to the cellular service provider, in 410, using the cellular network. In other words, the femtocell may provide the communication signals using the mobile station transmitter/receiver according to typical cellular network techniques (e.g., by transmitting the signals to the nearest macro cell base station or cell tower).

In one embodiment, the femtocell base station may receive the signals and provide them to the mobile station transmitter/receiver for transmission to the cellular network. Alternatively, the mobile station transmitter/receiver may receive the signals directly.

Additionally, it should be noted that any communications from the cellular service provider may be received via mobile station transmitter/receiver. For example, the cellular service provider may send one or more signals to invoke testing (e.g., in the case of a communications device malfunction) via the mobile station transmitter/receiver. Note that these signals may or may not have been typically sent via the wide area network using the femtocell base station.

If and when the wide area network becomes operable or available, the communications device may revert back to using the femtocell base station for transmission of signals to the cellular provider over the wide area network.

FIGS. 5A and 5B—Testing of the Communications Device

FIGS. 5A and 5B illustrate exemplary methods for performing testing on the communications device. More specifically, the following Figures describe specific embodiments which may relate to performing loopback testing in response to receiving testing signals from the cellular service provider. The method shown in FIGS. 5A and 5B may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a testing signal may be received from a cellular service provider. In some embodiments, the testing signal may be received over the cellular network using the mobile station transmitter/receiver. Alternatively, or additionally, the testing signal may be received over the wide area network using the femtocell base station.

In 504, the femtocell base station may generate wireless signals intended for a mobile device, in response to the testing signal received in 502.

In 506, the mobile station transmitter/receiver may receive the wireless signals transmitted in 504.

In 508, testing results may be determined based on the wireless signals received by the mobile station transmitter/receiver. For example, the strength of the wireless signals generated by the femtocell base station may be determined, e.g., for troubleshooting purposes. Alternatively, or additionally, the ability of the mobile transmitter/receiver to receive the wireless signals may be determined.

Accordingly, the testing results may be used to troubleshoot or adjust operation of the communications device in order to better serve the user and/or cellular service provider. Thus, FIG. 5A illustrates one embodiment of loopback testing initiated by the cellular service provider.

In 512, a testing signal from the cellular service provider may be received. As in 502, the testing signal may be received by the mobile station transmitter/receiver and/or the femtocell base station.

In 514, the mobile station transmitter/receiver may generate wireless signals, e.g., that emulate signals generated by a mobile device, in response to 512.

In 516, the femtocell base station may receive the wireless signals generated by the mobile station transmitter/receiver.

In 518, testing results may be determined based on the wireless signals received by the femtocell base station. For example, the strength of the wireless signals generated by the mobile station transmitter/receiver may be determined, e.g., for troubleshooting purposes. Alternatively, or additionally, the ability of the femtocell base station to receive the wireless signals may be determined.

Accordingly, the testing results may be used to troubleshoot or adjust operation of the communications device in order to better serve the user and/or cellular service provider. Thus, FIG. 5B illustrates one embodiment of loopback testing initiated by the cellular service provider.

Figure 6:
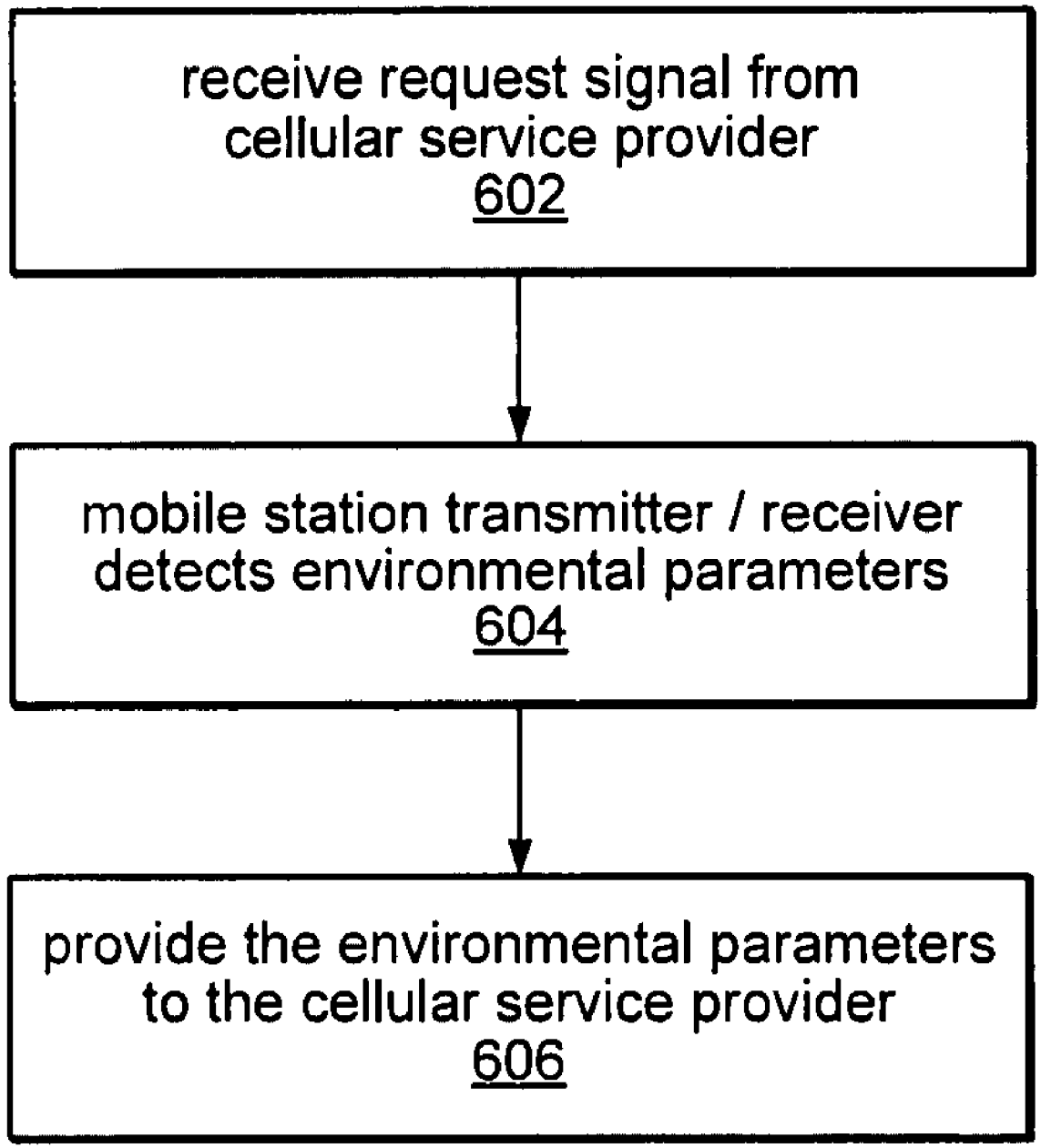
FIG. 6 is a flowchart of an exemplary method for detecting and reporting environmental parameters of the communications device.

FIG. 6—Detecting and Reporting Environment of the Communication Device

FIG. 6 illustrates an exemplary method for detecting and reporting environmental parameters of the communications device. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a request signal may be received from the cellular service provider. Similar to above, the request signal may be received by the femtocell base station and/or the mobile station transmitter/receiver. The request signal may be transmitted to the communications device at various points. For example, the request may be sent during initial set up of the communications device, possibly before the femtocell base station is able to communicate with the cellular service provider over the wide area network. Alternatively, or additionally, the signal may be sent on a periodic basis (e.g., once a day, once every few days, once a week, etc.) or during troubleshooting to adjust settings/ parameters of the communication device, e.g., for better operation. However, in one embodiment, the detection and reporting described herein may be performed on a periodic basis by the communications device without receiving signals from the cellular network.

In 604, the mobile station transmitter/receiver may detect environmental parameters or factors of the communications device. More specifically, the mobile station transmitter/receiver may detect surrounding macro base stations (e.g., cell towers), possibly including PN offset values; overhead parameters, pilot strength of surrounding base stations, activity of CDMA channels, and/or other parameters. In one embodiment, the mobile station transmitter/receiver may determine any radio factors which may affect the operation of the communications device. For example, if the user owns wireless phones that operate in a similar frequency as the communications device, these frequencies may be detected and recorded, e.g., to adjust the parameters of the communications device, e.g., to avoid those frequencies. As another example, detection of neighboring femtocells or macro cells (and their corresponding strength) may indicate how strong a signal the communications device should produce, or an area that the communications device should cover.

In 606, the environmental parameters may be provided to the cellular service provider. In one embodiment, the cellular service provider may adjust operational parameters of the communications device based on the received environmental parameters. Alternatively, or additionally, the cellular service provider may adjust operational parameters of neighboring femtocells, communications devices, macro cells, etc. based on the received environmental parameters.

Alternatively, or additionally, the communications device may be adjusted by the user of the communications device (e.g., in response to the detected signals, or a customer service representative) or the communications device may be automatically modified or adjusted, e.g., by the communications device itself and/or the cellular service provider, based on the determined environmental parameters.

Thus, environmental parameters of the communications device may be determined, reported, and/or adjusted, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A communications device, comprising:
a femtocell base station for providing bi-directional communication for one or more mobile devices to a cellular network, wherein the femtocell base station is configured to communicate with the cellular network using a wide area network;
a mobile station transmitter and receiver coupled to the femtocell base station, wherein the mobile station transmitter and receiver is configured to perform radio frequency (RF) wireless communication with the cellular network, wherein the mobile station transmitter and receiver is configured to receive a command from the cellular network and/or an external device to perform loopback testing, wherein the loopback testing involves the mobile station transmitter and receiver and the femtocell base station; and
a port coupled to at least one of the femtocell base station or the mobile station transmitter and receiver, wherein at least one of the femtocell base station or the mobile station transmitter and receiver is configured to communicate using the port;
wherein, to perform the loopback testing:
the mobile station transmitter and receiver is configured to generate wireless signals, wherein the wireless signals emulate signals generated by a mobile device;
the femtocell base station is configured to receive the wireless signals; and
the communications device is configured to perform testing based on the wireless signals received by the femtocell base station.

2. The device of claim 1,
wherein the mobile station transmitter and receiver is configured to provide the command to the femtocell base station;
wherein the femtocell base station is configured to perform the loopback testing based on the received command.

3. The device of claim 1,
wherein, to perform the loopback testing, the femtocell base station is configured to generate wireless signals intended for a mobile device;
wherein the mobile station transmitter and receiver is configured to receive the wireless signals intended for the mobile device;
wherein the communications device is configured to perform testing based on the wireless signals received by the mobile station transmitter and receiver.

4. The device of claim 1,
wherein the mobile station transmitter and receiver is configured to provide bi-directional communication between the one or more mobile devices and the cellular network when the wide area network is not operational.

5. The device of claim 1,
wherein the mobile station transmitter and receiver is configured to receive communications from the cellular network when the wide area network is not operational.

6. The device of claim 1,
wherein the mobile station transmitter and receiver is configured to detect and report environmental parameters to the cellular network.

7. The device of claim 1, wherein the femtocell base station comprises:
a processor; and
a memory medium, wherein the memory medium stores program instructions executable by the processor to perform IP communication over the wide area network using the port.

8. The device of claim 1, wherein the mobile station transmitter and receiver comprises:
a processor; and
a memory medium, wherein the memory medium stores program instructions executable by the processor to perform the RF wireless communication.

9. A method, comprising:
receiving first wireless signals generated by a femtocell base station, wherein the first wireless signals emulate signals generated by a mobile device, wherein the first wireless signals are received by a mobile station transmitter and receiver coupled to the femtocell base station, wherein the femtocell base station and the mobile station transmitter and receiver are comprised in a communication device;

generating second wireless signals wherein the second wireless signals emulate signals generated by a mobile device, wherein the second wireless signals are generated by the mobile station transmitter and receiver, wherein the second wireless signals are intended for reception by the femtocell base station coupled to the mobile station transmitter and receiver;

determining testing results based on the first wireless signals received by the mobile station transmitter and receiver and based on the second wireless signals received by the femtocell base station.

10. The method of claim 9,
wherein the first wireless signals and the second wireless signals are each generated in response to a testing signal from a cellular service provider.

11. The method of claim 9, further comprising:
the mobile station transmitter and receiver performing wireless communication with the cellular network.

12. The method of claim 9, further comprising:
receiving a request signal from a cellular server provider;
detecting environmental parameters of the mobile station transmitter and receiver; and
providing the environmental parameters to the cellular server provider.

13. A method, comprising:
a femtocell base station providing bi-directional communication for one or more mobile devices, wherein said providing comprises performing internet protocol (IP) communication with a cellular network over a wide area network;
a mobile station transmitter and receiver performing wireless communication with the cellular network;
wherein the mobile station transmitter and receiver and the femtocell base station are comprised in a housing of a communications device for providing cellular services for the one or mobile devices;
receiving a command from the cellular network to perform loopback testing;
performing loopback testing using the femtocell base station and the mobile station transmitter and receiver, wherein said performing loopback testing comprises:
the mobile station transmitter and receiver generating wireless signals, wherein the wireless signals emulate signals generated by a mobile device;
the femtocell base station receiving the wireless signals; and
determining testing results based on the wireless signals received by the femtocell base station.

14. The method of claim 13, wherein said performing loopback testing comprises the femtocell base station performing a test based on the received command.

15. The method of claim 13, wherein said performing loopback testing comprises:
the femtocell base station generating wireless signals intended for a mobile device;
the mobile station transmitter and receiver receiving the wireless signals intended for the mobile device; and
determining testing results based on the wireless signals received by the mobile station transmitter and receiver.

16. The method of claim 13, wherein the mobile station transmitter and receiver performing wireless communication with the cellular network comprises providing bi-directional wireless communication with the cellular network for the one or more mobile devices when the wide area network is not operational.

17. The method of claim 13, further comprising:
the mobile station transmitter and receiver detecting radio environmental parameters; and
providing the radio environmental parameters to the cellular network.

18. A communications device, comprising:
a femtocell base station for providing bi-directional communication for one or more mobile devices to a cellular network, wherein the femtocell base station is configured to communicate with the cellular network using a wide area network;
a mobile station transmitter and receiver coupled to the femtocell base station, wherein the mobile station transmitter and receiver is configured to perform radio frequency (RF) wireless communication with the cellular network; and
housing, wherein the femtocell base station and the mobile station transmitter and receiver are comprised in the housing;
wherein the mobile station transmitter and receiver is configured to generate wireless signals, wherein the wireless signals emulate signals generated by a mobile device;
wherein the femtocell base station is configured to receive the wireless signals; and
wherein the communications device is configured to perform testing based on the wireless signals received by the femtocell base station.

* * * * *